United States Patent
Bellosta Von Colbe et al.

(10) Patent No.: US 11,616,245 B2
(45) Date of Patent: Mar. 28, 2023

(54) APPARATUS COMPRISING A METAL HYDRIDE STORE FOR OPERATING AN EXOTHERMIC HYDROGEN CONSUMER

(71) Applicants: Helmholtz-Zentrum Geesthacht Zentrum für Material- und Küstenforschung GmbH, Geesthacht (DE); Panco GmbH, Mülheim-Kärlich (DE)

(72) Inventors: José M. Bellosta Von Colbe, Wentorf (DE); Thomas Klassen, Wentorf (DE); Martin Dornheim, Reppenstedt (DE); Julian Jepsen, Hamburg (DE); Klaus Taube, Hamburg (DE); Julián Puszkiel, Barcelona (ES); Dieter Platzek, Mülheim-Kärlich (DE)

(73) Assignee: Helmholtz-Zentrum hereon GmbH

( * ) Notice: Subject to any disclaimer, the term of this patent is extended or adjusted under 35 U.S.C. 154(b) by 149 days.

(21) Appl. No.: 17/122,585

(22) Filed: Dec. 15, 2020

(65) Prior Publication Data

US 2021/0194026 A1    Jun. 24, 2021

(30) Foreign Application Priority Data

Dec. 23, 2019   (EP) .................... 19219241

(51) Int. Cl.
*H01M 8/065* (2016.01)
*H01M 8/04007* (2016.01)
*H01M 8/04082* (2016.01)
*H01M 8/0612* (2016.01)

(52) U.S. Cl.
CPC ....... *H01M 8/065* (2013.01); *H01M 8/04007* (2013.01); *H01M 8/04201* (2013.01); *H01M 8/0618* (2013.01); *H01M 2250/20* (2013.01)

(58) Field of Classification Search
CPC ............. H01M 8/065; H01M 8/04007; H01M 8/04201; H01M 8/0618; H01M 2250/20
USPC ........................................ 429/421
See application file for complete search history.

(56) References Cited

U.S. PATENT DOCUMENTS

| | | | |
|---|---|---|---|
| 2001/0026882 A1 | 10/2001 | Thierfelder et al. | |
| 2004/0200209 A1* | 10/2004 | Kirwan ................ | B01D 53/02 60/284 |
| 2017/0214067 A1* | 7/2017 | Park ................... | H01M 8/04029 |
| 2018/0233753 A1* | 8/2018 | Jang ................... | H01M 8/04291 |

FOREIGN PATENT DOCUMENTS

| | | |
|---|---|---|
| DE | 19836352 A1 | 2/2000 |
| DE | 10317123 B4 | 9/2007 |
| EP | 1468722 A2 | 10/2004 |

OTHER PUBLICATIONS

Akanji et al. Modeling of Hydrogen Adsorption/Desorption in a Metal Hydride Bed Reactor. Adv. Mater. for Renewable Hydrogen Production, Storage and Utilization. 2015, pp. 95-118. Retrieved from <URL: https://www.intechopen.com/chapters/49322> (Year: 2015).*
Klebanoff et al. Final Report for the DOE Metal Hydride Center of Excellence. Energy.gov. 2012. Retrieved from <URL: https://www.energy.gov/eere/fuelcells/downloads/final-report-doe-metal-hydride-center-excellence> (Year: 2012).*
European communication dated Jun. 30, 2020 in corresponding European patent application No. 19219241.7.
Burger et al., "Advanced Reactor Concept for Complex Hydrides: Hydrogen Absorption from Room Temperature", International Journal of Hydrogen Energy, vol. 39, pp. 7030-7041, 2014.
Kolbig et al., "Characterization of Metal Hydrides for Thermal Applications in Vehicles Below 0 ° C.", International Journal of Hydrogen Energy, vol. 44, pp. 4878-4888, 2019.
Sakintuna et al., "Metal Hydride Materials for Solid Hydrogen Storage: A Review", International Journal of Hydrogen Energy, vol. 32, pp. 1121-1140, 2007.

* cited by examiner

*Primary Examiner* — James M Erwin
(74) *Attorney, Agent, or Firm* — Nields, Lemack & Frame, LLC

(57) ABSTRACT

The invention relates to a cold start apparatus for an exothermic hydrogen consumer such as a fuel cell and also a method for operating an exothermic hydrogen consumer having a metal hydride store or hydrogen supply from a reformer. It is an object of the present invention to provide a fuel cell having an efficient cold start apparatus, which can be taken into operation immediately and does not require any pressure tank. Furthermore, the cold start apparatus should be available for an unlimited number of starting operations. The object is achieved by an apparatus for operation of a fuel cell or another exothermic hydrogen consumer, which comprises at least one starter tank comprising a metal hydride having cold start properties and also at least one operating tank comprising at least one intermediate-temperature hydride or at least one reformer, wherein the starter tank is in fluidic communication with the exothermic hydrogen consumer and the operating tank or the reformer, wherein the first starter tank comprises a metal hydride which has an equilibrium pressure for desorption at a temperature of −40° C. of at least 100 kPa and further comprises a cooling device in order to be able to be reloaded with hydrogen by the operating tank or the reformer while the fuel cell is being supplied.

21 Claims, No Drawings

APPARATUS COMPRISING A METAL HYDRIDE STORE FOR OPERATING AN EXOTHERMIC HYDROGEN CONSUMER

FIELD OF THE INVENTION

The invention relates to a cold start apparatus comprising a metal hydride store for exothermic hydrogen consumers such as a fuel cell and also a method for operating such an exothermic hydrogen consumer.

BACKGROUND OF THE INVENTION

In the electrolysis of water, water molecules are split into hydrogen ($H_2$) and oxygen ($O_2$) by means of an electric current. In a fuel cell, this process proceeds in the opposite direction. The energy liberated by the electrochemical combination of hydrogen ($H_2$) and oxygen ($O_2$) into water is converted with a high efficiency into electric power.

The industrial implementation of the principle of the fuel cell has led to various approaches using different types of electrolytes and operating temperatures in the range from 10° C. to 1000° C. Depending on their operating temperature, the fuel cells are classified as low-temperature, intermediate-temperature and high-temperature fuel cells (see, for example, DE 198 36 352 A1). Low-temperature fuel cells operate at comparatively moderate operating temperatures of from 60° C. to 120° C. and, due to the moderate temperatures, are particularly suitable for mobile applications such as the operation of a motor vehicle. In motor vehicles, the fuel cell of the low-temperature PEM type is preferably used and operated at temperatures in the range from 60° C. to 90° C.

The hydrogen required as fuel is usually provided from a pressure tank since hydrogen can be made available over the entire operating temperature range when using such a tank. However, these pressure tanks are comparatively bulky, so that the range of mobile applications such as during operation of a motor vehicle is restricted by the limited storage space available. It is known that hydrogen stores which take up very much less space at comparable capacity can be formed on the basis of metal hydrides, and these are known as metal hydride stores. However, heat generally has to be supplied to metal hydride stores in order to desorb hydrogen; in the absorption of hydrogen, heat has to be removed. Depending on the metal hydride, temperatures in the range from −30° C. to 400° C. are necessary for hydrogen desorption. However, hydrogen pressures of less than 10 MPa, which are adequate for operation of a fuel cell, are generally necessary, which considerably simplifies the construction of these tanks compared to hydrogen pressure tanks.

Metal hydrides used as hydrogen stores are also divided into various categories as a function of the desorption temperature. An overview of customary metal hydrides and the properties thereof may be found in B. Sakintuna et al. "*Metal hydride materials for solid hydrogen storage: A review*", International Journal of Hydrogen Energy, vol. 32 (2007), 1121-1140, which is hereby incorporated by reference. Hydrogen is incorporated (absorbed) in the metal lattice or released (desorbed) from the hydride according to the equation:

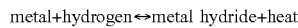

metal+hydrogen⇌metal hydride+heat

The relationship between pressure, temperature and hydrogen concentration in the metal is represented as concentration-pressure isotherm (CPI). Hydrogen is dissolved in the metal lattice at a particular temperature when the pressure is increased. This process obeys Sieverts's law up to attainment of a saturation concentration (α-phase). The concentration in the metal then increases without a pressure increase—the hydride phase (β-phase) is formed. This plateau region obeys both the van't-Hoff law and the Gibbs phase rule. At the end of the plateau, the pressure rises again quadratically and hydrogen is dissolved in the hydride phase according to the Sieverts law. To compare various hydrides, it has been customary to construct van't-Hoff diagrams using the equilibrium values in the middle of the plateau. The reaction enthalpy for the hydrogen absorption reaction ($\Delta H_{abs}$) can be read off from the gradient of the lines.

In the case of intermediate temperature hydrides, desorption at a standard pressure of 10 kPa commences in the range from 100° C. to 200° C. Intermediate-temperature hydrides are defined by an absolute reaction enthalpy ($\Delta H_{abs}$) for the hydrogen absorption reaction in the range from 30 kJ/mol of $H_2$ to 65 kJ/mol of $H_2$. In general, they have a storage density for hydrogen of from about 2.5% by weight to 5% by weight based on the parent metal. Intermediate-temperature hydrides include, inter alia, alanates such as $NaAlH_4$ and amides such as $LiNH_2$ having an $H_2$ absorption capacity of up to 4.5% by weight. The optimal hydrogen absorption temperature is, for example, about 125° C. for sodium alanate, and the hydrogen release temperature is from 160 to 185° C. Intermediate-temperature hydrides are interesting candidates for mobile applications because of the relatively high hydrogen storage capacity and relatively low operating temperatures.

In the case of high-temperature hydrides, desorption at a standard pressure of 10 kPa commences at above 200° C. They are defined by an absolute reaction enthalpy $\Delta H_{abs}$ for the hydrogen absorption reaction of more than 65 kJ/mol of $H_2$. They generally have an even higher storage density for hydrogen of from about 7% by weight to 15% by weight based on the parent metal. Often formed by light metals (magnesium, aluminum) and/or nonmetals (nitrogen, boron), they would possibly be suitable for use in fuel cells and $H_2$ internal combustion engines because of the high capacities, but the high temperatures stand in the way of their use as stores for fuel cells. High-temperature hydrides are therefore not used at present in fuel cells and $H_2$ internal combustion engines.

Low-temperature hydrides having a desorption temperature at a standard pressure of 10 kPa in the range from −40° C. to below 100° C. are used for mobile applications only in very specific cases, especially for prototypes of forklifts and bicycles, in the case of which a low storage capacity can be accepted, because of their relatively low weight-based storage capacity for hydrogen of less than 2% by weight. They are defined by an absolute reaction enthalpy $\Delta H_{abs}$ for the hydrogen absorption reaction of less than 30 kJ/mol of $H_2$.

For the general use of metal hydride stores, it is therefore necessary to have an external heating system which heats the metal hydride store to its discharge temperature. The energy required for heating the metal hydride store has hitherto generally been taken from the fuel cell or another heat source. However, taking-off of the required energy for discharge of a metal hydride store is not possible when starting up the fuel cell and in the first minutes of the operation thereof when it does not yet provide sufficient heat for heating the metal hydride store. Furthermore, the fuel cells known in practice can produce electric power for external use only above a particular start temperature. In the case of a cold start or an immediate start, a fuel cell thus firstly has to be heated to temperatures above the start temperature. Owing to the large thermal mass of fuel cells, a considerable heating power is required for this purpose, especially when the cold start is to occur in similarly short times, as in the case of conventional internal combustion engines.

The same also applies to supplying a fuel cell with hydrogen from reformers which use fuels such as methanol, ammonia, formic acid or LOHCs ("liquid organic hydrogen carriers"). To start the fuel cell by means of a reformer, energy which is not yet available in the system is also required here.

A fuel cell for mobile use having a cold start apparatus, which comprises a hydrogen pressure tank as hydrogen store and a metal hydride heating device, is known from DE 103 17 123 B4. Hydrogen from the pressure tank is passed over the desorbed metal hydride store. This heats up with formation of the corresponding metal hydride and thus improves the performance of the fuel cell system. However, the number of cold start processes and immediate start processes is limited in the case of the cold start apparatus known from DE 103 17 123 B4 by the size of the pressure store because the pressure store is gradually discharged and not automatically recharged on each cold and immediate start. This system thus offers only an improved function of a pressure tank-based store, which is capable of cold and immediate starts even without this apparatus.

I. Burger et al. "Advanced reactor concept for complex hydrides: Hydrogen absorption from room temperature", International Journal of Hydrogen Energy, vol. 39 (2014), pages 7030-7041, discloses a combination of a complex hydride (CxH) and a room-temperature hydride (MeH) in a tank using the high loading capacity of the complex hydrides and the high reaction rate of the room-temperature hydrides to improve the cold start properties. The room-temperature hydride is loaded with hydrogen during the cold start and heats up as a result of the exothermic reaction. The complex hydride also heats up as a result and is thus slowly brough to operating temperature, releases hydrogen and thus supplies the fuel cell with hydrogen. Due to this reaction cascade of room-temperature hydride and complex hydride and the slow heating of the complex hydride, the system is comparatively sluggish. In addition, the document does not describe how the loading of the room-temperature hydride is to be carried out.

M. Kölbig et al. "Characterization of metal hydrides for thermal applications in vehicles below 0° C.", International Journal of Hydrogen Energy, Vol. 44 (2019), pages 4878-4888, addresses the charging and discharging of a closed system composed of $LaNi_{4.85}Al_{0.15}$ as heat-generating metal hydride and HYDRALLOY C5® ($Ti_{0.95}Zr_{0.05}Mn_{1.46}V_{0.45}Fe_{0.09}$) as hydride-supplying metal hydride below 0° C.

All the above mentioned systems are based on the fuel cell being supplied by a metal hydride which is heated by means of another source before start-up. Only after the metal hydride has been heated up can the fuel cell be operated. It is an object of the present invention to provide an efficient cold start apparatus for an exothermic hydrogen consumer such as a fuel cell, which apparatus can be taken into operation immediately and does not require any pressure tank or external hydrogen source, which are disadvantageous because of the limited space available, e.g. in passenger cars. Furthermore, the cold start apparatus should be available for a number of starting operations which is independent of its storage capacity.

SUMMARY OF THE INVENTION

According to the invention, this object is achieved by a method for operating an exothermic hydrogen consumer such as a fuel cell, having the features indicated in claim 1. Preferred embodiments of the invention are set forth in the dependent claims.

A first embodiment of the invention provides an apparatus for operating an exothermic hydrogen consumer such as a fuel cell, wherein the apparatus comprises the exothermic hydrogen consumer, at least one starter tank comprising a first metal hydride having cold start properties and also at least one operating tank comprising at least one second metal hydride having an absolute reaction enthalpy for the hydrogen absorption reaction ($\Delta H_{abs}$) of less than 80 kJ/mol of $H_2$, preferably in the range from 20 kJ/mol of $H_2$ to less than 65 kJ/mol of $H_2$, which has an equilibrium pressure for the desorption of hydrogen at a temperature of −40° C. of less than 100 kPa, or at least one reformer, wherein the starter tank is in fluidic communication with the exothermic hydrogen consumer and the operating tank or the reformer, wherein the first metal hydride having cold start properties has an equilibrium pressure for the desorption of hydrogen at a temperature of −40° C. of at least 100 kPa and the starter tank further comprises a cooling device in order to be able to be loaded with hydrogen by the operating tank or the reformer while the exothermic hydrogen consumer is being supplied.

The exothermic hydrogen consumer is preferably a fuel cell which comprises at least one cathode and at least one anode with an electrolyte arranged in between. The exothermic hydrogen consumer is most preferably a PEM fuel cell, e.g. a low-temperature PEM fuel cell.

The starter tank preferably has a spherical or cylindrical shape. In one embodiment of the invention, the metal hydride of the starter tank is based on a titanium-chromium-manganese alloy.

A second embodiment of the invention provides a method for operating an exothermic hydrogen consumer such as a fuel cell, wherein the exothermic hydrogen consumer is initially supplied with hydrogen from at least one starter tank comprising a first metal hydride which has an equilibrium pressure for desorption at a temperature of −40° C. of at least 100 kPa and after attainment of the operating temperature of the exothermic hydrogen consumer is supplied with hydrogen from at least one operating tank comprising at least one second metal hydride having an absolute reaction enthalpy for the hydrogen absorption reaction ($\Delta H_{abs}$) of less than 80 kJ/mol of $H_2$, preferably in the range from 20 kJ/mol of $H_2$ to less than 65 kJ/mol of $H_2$, and has an equilibrium pressure for the desorption of hydrogen at a temperature of −40° C. of less than 100 kPa or a reformer, and the metal hydride of the starter tank is cooled in order to be loaded with hydrogen from the second operating tank or the reformer while the hydrogen consumer is simultaneously being supplied by the second operating tank or the reformer.

As mentioned above, the hydrogen consumer is initially supplied with hydrogen from the starter tank, with the starter tank preferably comprising at least one metal hydride which has an equilibrium pressure for desorption at a temperature of −40° of at least 300 kPa, more preferably at least 1000 kPa and in particular at least 1300 kPa, which is particularly advantageous for fuel cells which are operated in the recirculation mode.

According to the method of the invention, an exothermic hydrogen consumer such as a fuel cell is, under cold start conditions, supplied with sufficient hydrogen from the starter tank so that the exothermic hydrogen consumer is started and can heat up to operating temperature. The operating tank or the reformer as main hydrogen store is then likewise heated to its operating temperature by means of the waste heat or the electric power, if present, from the exothermic hydrogen consumer, e.g. a fuel cell, and takes over supplying the hydrogen consumer with hydrogen. When the hydrogen consumer is being supplied by the operating tank or the reformer, the starter tank is loaded again with hydrogen from the operating tank or the reformer. For this purpose, it is necessary for the starter tank to be cooled, for example by means of Peltier elements. Cooling decreases the equilibrium pressure of the first metal hydride in the starter tank and this can then be loaded again with hydrogen from the main store (operating tank or reformer), so that a renewed starting operation can be carried out after switching off the exothermic hydrogen consumer. For this purpose, it is necessary for the starter tank to be connected between hydrogen consumer and operating tank, or for starter tank, hydrogen consumer and operating tank to be arranged so that the hydrogen from the starter tank can flow to the consumer but also (in separated switching form) from the operating tank to the starter tank.

The method described, involving loading the starter tank again during operation of the exothermic hydrogen consumer, allows, compared to previous approaches, a significantly greater number of cold start operations which is not restricted by the volume of starter tank and is thus an advantage of the invention, in addition to the simplified construction of the apparatus for operation of, for example, a fuel cell. In addition, the approach provided by the invention allows the use of a very inexpensive store solution for the main hydrogen store without this itself having to have cold and/or immediate start properties. As a result, it is possible to use metal hydrides having a higher efficiency or other, inexpensive hydrogen supply apparatuses which are not capable of cold and/or immediate starts (e.g. reformers). The apparatus of the invention and the method of the invention ensure the provision of hydrogen for operation of the exothermic hydrogen consumer, particularly at low temperatures and, for example, as fuel cell for automotive applications, without delay as in the case of a pressure tank, but without the expensive construction thereof and with a very much smaller space requirement.

In a further embodiment of the invention, the starter tank has a shell around the first metal hydride present therein, which shell can withstand the hydrogen pressures up to the maximum equilibrium pressure of the hydride at the operating temperature of the exothermic hydrogen consumer such as a fuel cell or the maximum operating temperature of an external heating device, preferably the Peltier element cooling which in reverse can function as heating. Superduplex steels or fiber-reinforced composites are preferred for the shell of the first metal hydride store. The lower the equilibrium pressure at the operating temperature of the exothermic hydrogen consumer and thus the maximum temperature possible in this system, the thinner and lighter can the shell of the first metal hydride store be.

In a further embodiment of the invention, the apparatus for operating an exothermic hydrogen consumer such as a fuel cell comprises a cooling system which cools the starter tank for reloading as soon as the operating tank or the reformer has taken over supplying the fuel cell. Peltier elements have the advantage here of being highly space-saving and allowing direct cooling of the shell by heat conduction or cooling the tank system by means of internal cooling channels by coupling with a heat exchanger. In addition, systems based on Peltier elements are maintenance-free since they do not contain any moving parts. Finally, they are easily reversible (cooling can also be used as heating by reversing the electric poles). As an alternative, it is also possible to use a conventional, compressor-based cooling facility, preferably one which is also reversible (functions as heating).

The metal hydride of the starter tank is preferably selected so that hydrogen is desorbed under subzero start conditions such as −40° C. or at similar low temperatures. Should a metal hydride having a higher desorption temperature be selected, heat transfer from the surroundings can be provided if necessary, e.g. at extremely low temperatures, by means of, for example, Peltier elements functioning as heating, by means of a conventional separate heating device or by the cooling medium of the exothermic hydrogen consumer, in order to nevertheless make hydrogen desorption possible.

An advantage is that the heat transfer is delayed by a low supply pressure of the exothermic hydrogen consumer or a high loading and operating pressure during operation, so that additional heat is required only when the system can in any case provide this heat.

When the exothermic hydrogen consumer has attained normal operating temperature (in the case of low-temperature PEM fuel cells from about 60° C. to 80° C.) as a result of operation made possible by the starter tank, the operating tank or the reformer and any further consumers present in the vehicle, for example vehicle interior heating, can be supplied with thermal energy from the waste heat of the fuel cell. A further part of the power, usually electric power, from the exothermic hydrogen consumer (e.g. less than 5%) is, after attainment of this operating state, utilized for cooling the starter tank via its dedicated cooling system.

The operating tank or reformer is preferably constructed so that at its intrinsic operating temperature, which is not necessarily the same as that of the exothermic hydrogen consumer, it generates a higher hydrogen pressure than the equilibrium pressure of the cold starter tank. The starter tank can thus be loaded again from the operating tank.

The heat arising in the starter tank during reloading of the starter tank is preferably removed in order to keep the equilibrium pressure of the starter tank constant and allow reloading of the starter tank. As soon as the starter tank is fully loaded, the cooling facility can be switched off.

The invention claimed is:

1. An apparatus for operating an exothermic hydrogen consumer, wherein the apparatus comprises the exothermic hydrogen consumer, at least one starter tank and also at least one operating tank, the at least one starter tank comprising a first metal hydride having cold start properties having an equilibrium pressure for the desorption of hydrogen at a temperature of −40° C. of at least 100 kPa, and the at least one operating tank comprising at least one second metal hydride, the at least one second metal hydride having an absolute reaction enthalpy for the hydrogen absorption reaction ($\Delta H_{abs}$) of less than 80 kJ/mol of $H_2$ and an equilibrium pressure for the desorption of hydrogen at a temperature of −40° C. of less than 100 kPa, wherein the at least one starter tank is in fluidic communication with the exothermic hydrogen consumer and the at least one operating tank and the at least one starter tank further comprising a cooling device in order to be able to be loaded with hydrogen from the operating tank while the exothermic hydrogen consumer is being supplied by the at least one operating tank.

2. The apparatus as claimed in claim 1, wherein the exothermic hydrogen consumer is a fuel cell which comprises at least one cathode and at least one anode with an electrolyte arranged between the at least one cathode and the at least one anode.

3. The apparatus as claimed in claim 1, wherein the at least one starter tank comprises a metal hydride which has an equilibrium pressure for desorption at a temperature of −40° C. of at least 300 kPa.

4. The apparatus as claimed in claim 3, wherein the at least one starter tank comprises a metal hydride which has an equilibrium pressure for desorption at a temperature of −40° C. of at least 1300 kPa.

5. The apparatus as claimed in claim 1, wherein the metal hydride of the at least one starter tank is based on a titanium-chromium-manganese alloy.

6. The apparatus as claimed in claim 1, wherein the cooling of the starter tank comprising the first metal hydride is effected by means of a Peltier element or by compressor-based cooling.

7. A method for operating an exothermic hydrogen consumer, wherein the exothermic hydrogen consumer being initially supplied with hydrogen from at least one starter tank comprising at least one first metal hydride which has an equilibrium pressure for the desorption of hydrogen at a temperature of −40° C. of at least 100 kPa, and after attainment of the operating temperature, the exothermic hydrogen consumer being supplied with hydrogen from at least one operating tank comprising at least one second metal hydride which has an absolute reaction enthalpy for the hydrogen absorption reaction ($\Delta H_{abs}$) of less than 80 kJ/mol of $H_2$ and an equilibrium pressure for the desorption of hydrogen at a temperature of −40° C. of less than 100 kPa, and wherein the first metal hydride of the at least one starter tank being cooled in order to be loaded with hydrogen from second operating tank while the hydrogen consumer is simultaneously being supplied with hydrogen from the second operating tank.

8. The method as claimed in claim 7, wherein the exothermic hydrogen consumer is a fuel cell which comprises at least one cathode and at least one anode with an electrolyte arranged in between.

9. The method as claimed in claim 7, wherein the at least one starter tank comprises a metal hydride which has an equilibrium pressure for the desorption of hydrogen at a temperature of −40° C. of at least 300 kPa.

10. The method as claimed in claim 9, wherein the at least one starter tank comprises a metal hydride which has an equilibrium pressure for the desorption of hydrogen at a temperature of −40° C. of at least 1000 kPa.

11. The method as claimed in claim 10, wherein the at least one starter tank comprises a metal hydride which has an equilibrium pressure for the desorption of hydrogen at a temperature of −40° C. of at least 1300 kPa.

12. The method as claimed in claim 7, wherein the metal hydride of the at least one starter tank is based on a titanium-chromium-manganese alloy.

13. The method as claimed in claim 7, wherein the cooling of the starter tank comprising the first metal hydride is effected by means of a Peltier element or by compressor-based cooling.

14. The method as claimed in claim 7, wherein waste heat of the hydrogen consumer is used to heat the at least one operator tank while the hydrogen consumer is being supplied by the at least one operating tank.

15. An apparatus for operating an exothermic hydrogen consumer, wherein the apparatus comprises the exothermic hydrogen consumer, at least one starter tank and also at least one reformer, the at least one starter tank comprising a first metal hydride having cold start properties having an equilibrium pressure for the desorption of hydrogen at a temperature of −40° C. of at least 100 kPa, wherein the at least one starter tank is in fluidic communication with the exothermic hydrogen consumer and the at least one reformer, wherein the first metal hydride having cold start properties and the at least one starter tank further comprises a cooling device in order to be able to be loaded with hydrogen from the at least one reformer while the exothermic hydrogen consumer is being supplied by the at least one reformer.

16. The apparatus as claimed in claim 2, wherein the at least one starter tank comprises a metal hydride which has an equilibrium pressure for desorption at a temperature of −40° C. of at least 300 kPa.

17. The apparatus as claimed in claim 15, wherein the at least one starter tank comprises a metal hydride which has an equilibrium pressure for desorption at a temperature of −40° C. of at least 1300 kPa.

18. The method as claimed in claim 8, wherein the at least one starter tank comprises a metal hydride which has an equilibrium pressure for the desorption of hydrogen at a temperature of −40° C. of at least 300 kPa.

19. The method as claimed in claim 17, wherein the at least one starter tank comprises a metal hydride which has an equilibrium pressure for the desorption of hydrogen at a temperature of −40° C. of at least 1000 kPa.

20. The method as claimed in claim 18, wherein the at least one starter tank comprises a metal hydride which has an equilibrium pressure for the desorption of hydrogen at a temperature of −40° C. of at least 1300 kPa.

21. A method for operating an exothermic hydrogen consumer, wherein the exothermic hydrogen consumer being initially supplied with hydrogen from at least one starter tank comprising at least one first metal hydride which has an equilibrium pressure for the desorption of hydrogen at a temperature of −40° C. of at least 100 kPa, and after attainment of the operating temperature, the exothermic hydrogen consumer being supplied with hydrogen from at least one reformer, and wherein the metal hydride of the at least one starter tank being cooled in order to be loaded with hydrogen from the at least one reformer while the hydrogen consumer is simultaneously being supplied with hydrogen from the at least one reformer.

* * * * *

UNITED STATES PATENT AND TRADEMARK OFFICE
CERTIFICATE OF CORRECTION

PATENT NO. : 11,616,245 B2
APPLICATION NO. : 17/122585
DATED : March 28, 2023
INVENTOR(S) : José M. Bellosta Von Colbe It is certified that error appears in the above-identified patent and that said Letters Patent is hereby corrected as shown below:

On the Title Page

Item (73), should read as follows:
-- (73) Assignee: Helmholtz-Zentrum hereon GmbH and Panco GmbH --

Signed and Sealed this
Eighth Day of October, 2024

Katherine Kelly Vidal
*Director of the United States Patent and Trademark Office*